Figure 1:
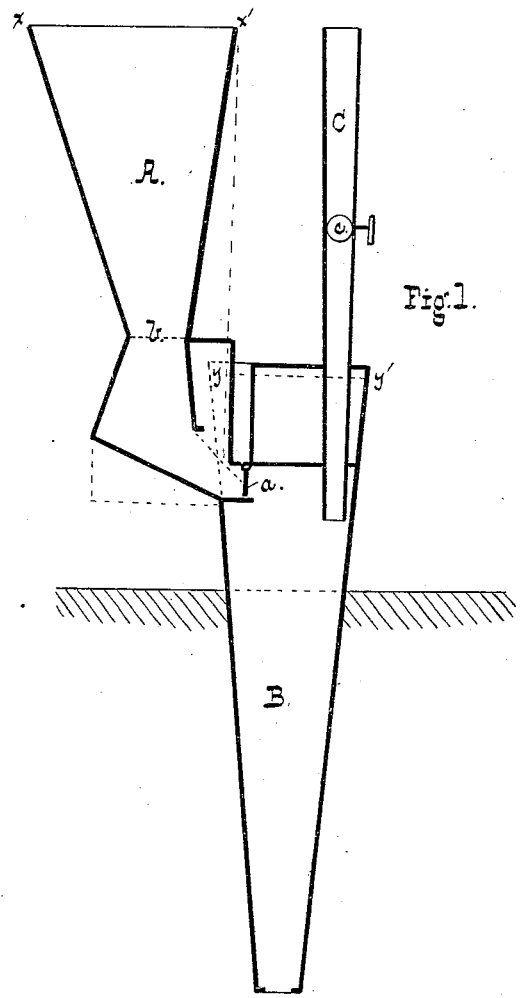
Figure 2:
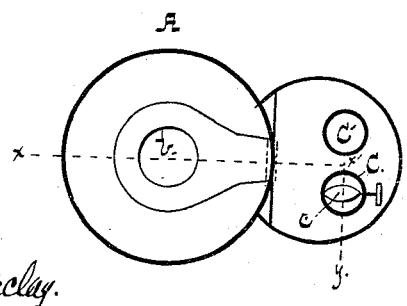
Figure 3:
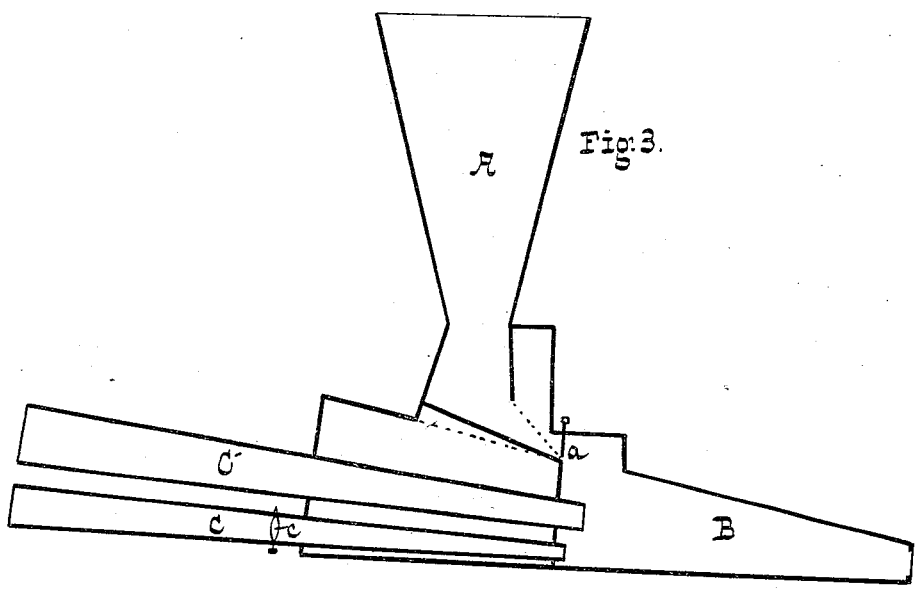
Figure 4:
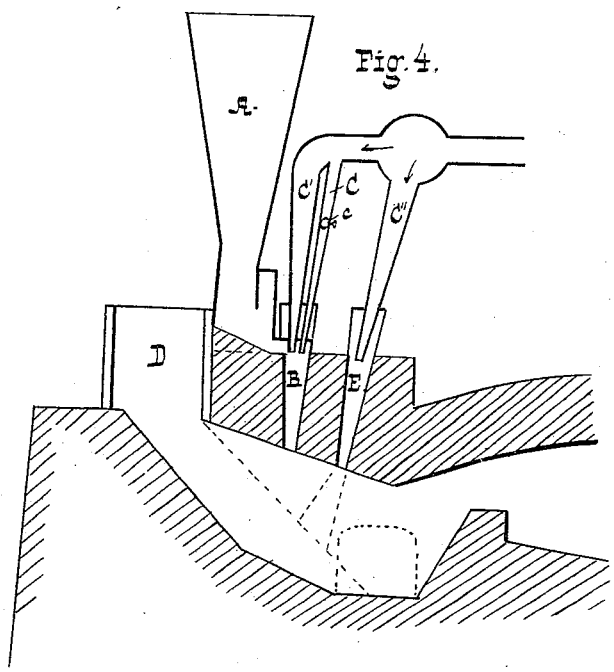
Figure 1:
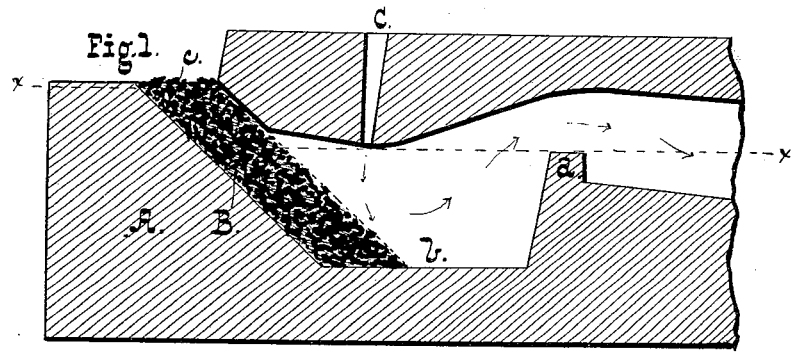
Figure 2:
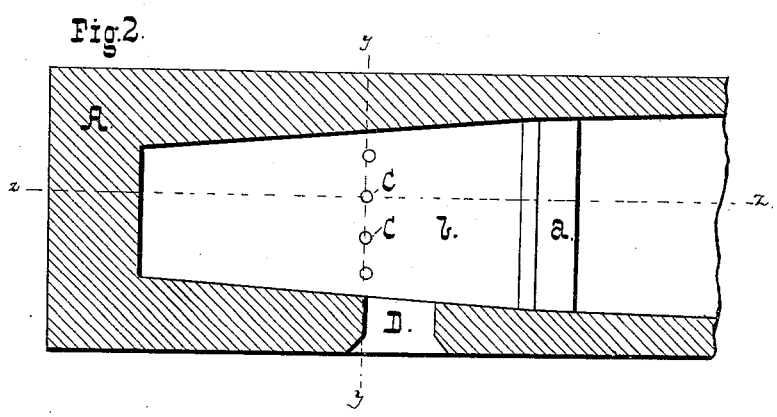
Figure 3:
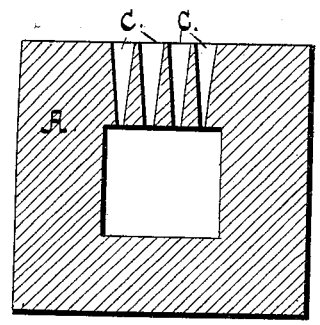

(No Model.)

2 Sheets—Sheet 1.

E. TOURANGIN.
BURNING PULVERULENT FUEL.

No. 265,347. Patented Oct. 3, 1882.

WITNESSES.
W. A. Butram
L. H. Barclay

INVENTOR
Ernest Tourangin
By P. D. Williams
ATTORNEY.

(No Model.)  2 Sheets—Sheet 2.

E. TOURANGIN.
BURNING PULVERULENT FUEL.

No. 265,347. Patented Oct. 3, 1882.

WITNESSES.
W. A. Bertram
DeL. H. Barclay

INVENTOR
Ernest Tourangin
By R. D. Williams,
ATTORNEY.

(No Model.)

E. TOURANGIN.
REVERBERATORY FURNACE.

No. 265,348. Patented Oct. 3, 1882.

WITNESSES.
W. A. Betram
Deof H. Bauday

INVENTOR
E. Tourangin
By R. D. Williams
ATTORNEY.